US005289047A

United States Patent [19]

Broghammer

[11] Patent Number: 5,289,047

[45] Date of Patent: Feb. 22, 1994

[54] SWITCH. ESPECIALLY BATTERY SWITCH FOR HAND-OPERATED ELECTRIC TOOLS

[75] Inventor: Peter Broghammer, Wurmlingen, Fed. Rep. of Germany

[73] Assignee: Marquart GmbH, Rietheim-Weilheim, Fed. Rep. of Germany

[21] Appl. No.: 879,379

[22] Filed: May 7, 1992

[30] Foreign Application Priority Data

May 7, 1991 [DE] Fed. Rep. of Germany ....... 4114854

[51] Int. Cl.[5] .............................................. H02D 5/16

[52] U.S. Cl. .................................. 307/125; 219/497; 361/702; 361/717; 361/711

[58] Field of Search ....................... 361/386, 383, 388; 363/141; 219/497; 307/125; 200/1 V

[56] References Cited

U.S. PATENT DOCUMENTS 4,100,383 7/1978 Piber .................................. 200/157

*Primary Examiner*—Jeffrey A. Gaffin
*Assistant Examiner*—Adnya Krishnan
*Attorney, Agent, or Firm*—Spencer, Frank & Schneider

[57] ABSTRACT

A switch, especially for use in a hand-operated storage-battery electric tool with a DC motor is proposed, in which control electronics are provided for changing the speed of the DC motor. In order to produce the switch as compactly as possible and without additional connecting lines to the power transistor and in order furthermore to influence positively the heat budget inside the switch, a contact system (5) and a freewheeling diode (8) are pivoted to a common bearing plate (11) which is connected in current-carrying and heat-conducting fashion via a connecting bolt (12) to a power transistor (7) on the housing. In this arrangement, the power transistor is cooled by a heat sink provided on the switch housing.

8 Claims, 1 Drawing Sheet

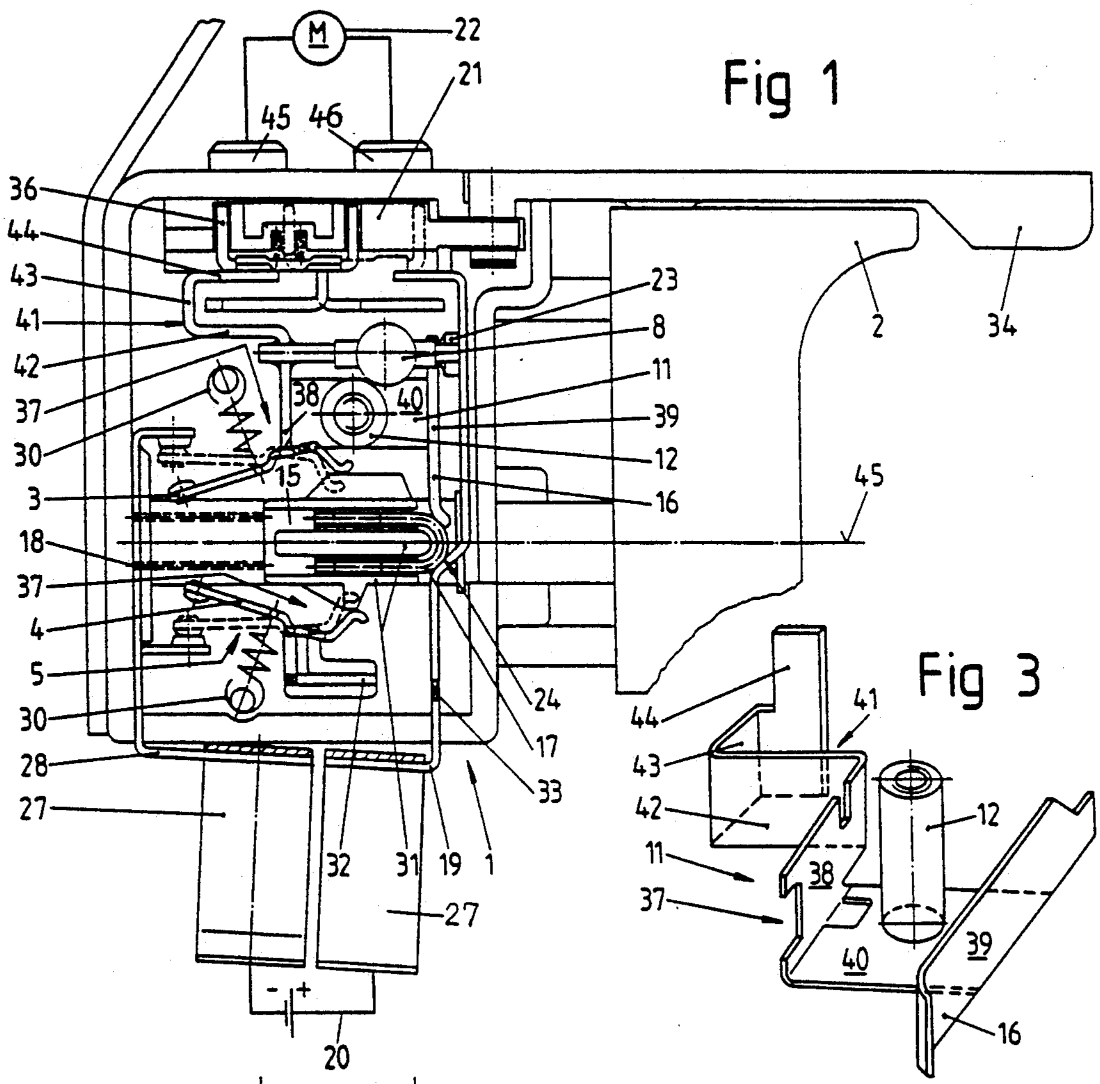
Fig 1
Fig 3
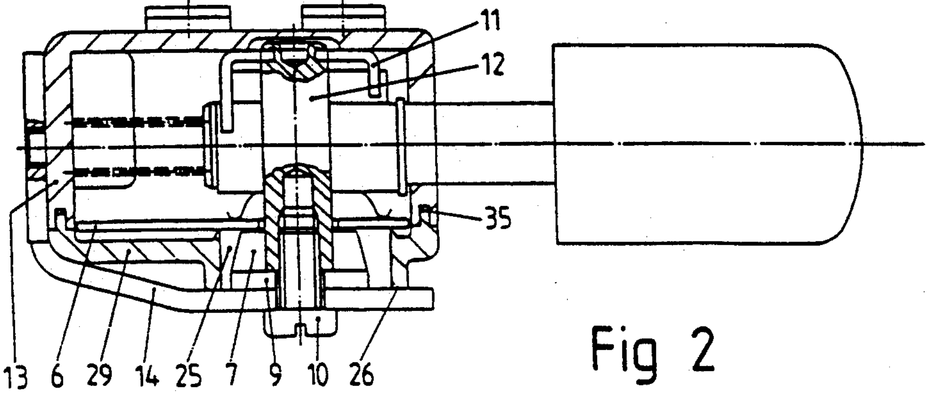
Fig 2

SWITCH. ESPECIALLY BATTERY SWITCH FOR HAND-OPERATED ELECTRIC TOOLS

BACKGROUND OF THE INVENTION

The invention relates to a batter switch, especially for use in a hand-operated electric tool which has a DC motor energized by a storage battery. The switch includes a longitudinally displaceable trigger which acts on a switching contact of a contact system, control electronics for changing the speed of the DC motor, a power transistor having a sheet metal cooling member and serving for changing the motor speed a freewheeling diode for protecting the control electronics.

Battery switches for electric tools are known which are constructed such that the power transistor is located outside the housing.

The transistor is electrically connected via litz wires to the control electronics and the switching system in the interior of the housing. A heat sink is connected to the power transistor.

As a rule, a freewheeling diode is plugged or soldered onto the printed circuit board of the control electronics, which is ineffective in conducting its heat to the outside. A changeover switch for right-handed/left-handed rotation is mounted on the actual switch, it being necessary here to provide leads from the actual switch to the R/L switch.

If there is a brake in these switches, it is often realized by a plurality of parts, it being the case that a positive opening is not always ensured by a spring-loaded brake contact. These switches have the disadvantage that fixing the power transistor to the switch via litz wires entails an increased requirement for parts, and thus higher costs. Furthermore, automatic installation of the switch in appliances provided therefore is difficult (flexurally slack parts). In addition, the transistor has to be screwed onto a heat sink.

A freewheeling diode that is fastened to the printed circuit board produces disadvantages because it heats up the control electronics and cannot conduct the heat to the outside.

The connecting lines from the switch to the R/L switch cause additional expenditure of installation and further connecting points which lead to voltage drops.

It is the object of the invention to remove these disadvantages. In particular, the aim is to eliminate connection of the power transistor via litz wires, which also leads to a reduction in parts.

Furthermore, the freewheeling diode is not to influence the control electronics by the heat produced.

In particular, it is to be possible for the heat produced in the switch, as caused by the contact system, freewheeling diode and brake, to be effectively conducted outside to the heat sink. Furthermore, the R/L switch is to be integrated in the actual switch by means of an appropriate arrangement, so that a compact design is achieved which has few connecting points and thus low losses.

This object is achieved by the invention, according to which the switch has a switch housing; first switch terminals connectable to the DC motor; second switch terminals connectable to the storage battery; a movable electric switching contact having open and closed positions; a manually engageable trigger slidably supported in the housing and cooperating with the switching contact for moving the switching contact into one of its positions; an electrically and thermally conducting one-piece bearing plate supported by the switch housing and control electronics having a power transistor for changing the motor current to vary the speed of the DC motor. The power transistor is supported by the bearing plate and is electrically and heat-transmittingly connected therewith. There is further provided a free wheeling diode which protects the control electronics and which has diode terminals. One diode terminal is electrically and heat-transmittingly connected to the bearing plate. An electrically conducting contact bar is connected to the other diode terminal, to one of the first switch terminals and to one of the second switch terminals; and an electrically and thermally conducting connecting post mounts the power transistor on the bearing plate. The power transistor is electrically connected to one of the second switch terminals by the switching contact in the closed position thereof and the bearing plate is connected to one of the first switch terminal.

BRIEF DESCRIPTION OF THE DRAWINGS

FIG. 1 shows a sectional side view,

FIG. 2 shows a sectional top view according to FIG. 1 below the freewheeling diode 8, and FIG. 3 shows a perspective view of the bearing plates with a connecting post.

DESCRIPTION OF THE PREFERRED EMBODIMENT

The battery switch 1 is connected electrically via contact clips 27 to the storage battery 20. Each of the contact clips 27 is connected electrically to the motor terminal contact bar 19 and the contact carrier 28.

The contact carrier 28 is installed in the switch housing 13 and leads the current to the contact system 5. The battery voltage is switched on and off by the switching contact 4. The control electronics 6 are short-circuited by the switching contact 3. This contact system is a switching contact that is supported in a knife-edge bearing 37 and is held closed via a tension spring 30. Located on the push rod 15 are links 31 which, with the push rod 15 not operated, hold the switching contacts 3, 4 in the open position. This is a positive opening.

The position, when the contact system 5 is to open or close, can be predetermined as a function of travel via the geometry of the links 31.

The switching contact 4 switches the voltage from the storage battery 20 to the control electronics and to the source terminal of the power transistor 7. In this case, the bearing 32 is soldered to the printed circuit board of the control electronics 6. The switching contact 3 short-circuits the control electronics 6 after a specific travel of the push rod 15, and conducts the battery voltage via the bearing plate 11 to the R/L changeover switch 21 and thus to a switch terminal 45 connectable to the motor 22.

The motor terminal contact bar 19 runs upwards from below (battery side) through the switch housing 13 as far as the R/L changeover switch 21 which is connected to another switch terminal 46 connectable to the motor 22. A soldering lug 33 supplies the control electronics 6 with the battery voltage. A part of the motor terminal contact, bar is constructed such that, like the contact arm 16, it forms a contact point 24 for the contact bridge 17, which short-circuits the motor winding and thus causes braking of the motor 22.

The contact bridge 17 is supported floating in the push rod 15 in a vertical direction relative to the pushrod axis 45, so that it can center itself. The contact force of the contact bridge 17 on the contact points 24 is achieved by means of the restoring spring 18. The fixed connection of the contact bridge 17 to the push rod 15 causes positive opening when the push rod is moved, as a result of which a short circuit of the battery voltage is ruled out. The heat produced in the contact system 5 in the freewheeling diode 8 and at the contact bridge 17 is conducted via the bearing plate 11 from the battery switch 1 onto the heat sink 14 which, in turn, can dissipate the heat to the surroundings. The bearing plate 11 with the connecting bolts 12 is represented in more detail perspectively in FIG. 3.

Heat conduction to the control electronics is avoided by the arrangement of the freewheeling diode 8 between the bearing plate 11 and the connecting terminal 23, which is located on the motor terminal contact bar 19.

Since the use of plug-in connections is eliminated in the switch as a whole, the voltage drops inside the battery switch are very small.

The type of connection between the R/L changeover switch 21 and the motor 22 can be realized by soldered-on, welded litz wires, or in a sealed fashion via fixed conductor tracks.

The motor current, which can reach very high values, flows not via the printed circuit board of the control electronics 6, but from the storage battery 20 via the contact carrier 28 and the switching contact 4, via the bearing 32 to the power transistor 7 via the cooling lug 9 onto the connecting bolt 12 and the bearing plate 11 and the R/L changeover switch 21 to the motor 22.

The U-shaped bearing plate 11 with the connecting bolt 12 leads the heat produced in the interior of the battery switch 1 outside to the heat sink 14, and conducts the motor current from the contact system 5 to the power transistor 7 and serves as a fastening element for the switch cover 29, the power transistor 7 and the heat sink 14. In this case, the cooling lug 9 of the power transistor 7 is clamped between the connecting post 12 and the heat sink 14 via the screw 10.

The bearing plate 11 thus fulfills a plurality of tasks, to be precise, current conduction through the switch housing, heat dissipation and the bearing of parts. For this purpose, the bearing plate 11 has the form represented in FIG. 3 of a U-shaped sheet-metal part with the side limbs 38, 39 and the connecting surface 40 for accommodating the connecting post 12. Located in the lower region on the side limb 38 is the knife-edge bearing 37, which is recessed in a U-shaped fashion. Provided in the upper region of this side limb 38 is a further U-shaped attachment 41 which consists of the side limb 42, which is bent at right angles, the base surface 43 and the further side limb 44, which is lengthened to the side. This attachment 41, integrally formed in one piece, serves as connecting element to the R/L switch 31. The side limb 39 serves in its lower, bent region as a contact point or as a contact arm 16 to the contact bridge 17.

Furthermore, the wall opening 25 in the switch housing 13 is sealed in a dustproof fashion by the heat sink 14, which rests on the wall surface 26. The heat sink 14 can be matched by its dimensions to the power class of the switch, and thus to the motor currents. Changing the speed of the motor 22 is taken care of by the control electronics 6, which change the pulse/pause ratio of the motor voltage depending on the position of the push rod 15. In this case, the position of the push rod is interrogated via a potentiometer. The potentiometer slider 35 is mounted on the push rod 15 and slides on the potentiometer track, which is located on the printed circuit board of the control electronics 6.

The direction of rotation of the motor 22 can be determined by the R/L changeover switch 21. In this case, the R/L changeover switch 21 has the function of a pole-reversing switch. The change lever 34 is mounted in the switch housing 13. The changeover is performed via two spring-loaded contact bridges 36 which are mounted in the left-hand part of the change lever 34. The change lever 34 can be latched in three positions, it being possible to construct the middle position as a starting lockout.

I claim:

1. In a switch for a hand-operated electric tool having a DC motor energized from a storage battery, the switch including a switch housing;

first switch terminals supported in said switch housing and being connectable to the DC motor;

second switch terminals supported in said switch housing and being connectable to the storage battery;

a movable electric switching contact having open and closed positions;

a manually engageable trigger slidably supported in the housing and cooperating with the switching contact for moving the switching contact into one of its said positions;

an electrically and thermally conducting one-piece bearing plate supported by said switch housing;

control electronics having a power transistor for changing the motor current to vary the speed of the DC motor; said power transistor being supported by the bearing plate and being electrically and heat-transmittingly connected therewith;

a freewheeling diode for protecting the control electronics; said freewheeling diode having first and second diode terminals; said first diode terminal being electrically and heat-transmittingly connected to said bearing plate;

the improvement comprising an electrically conducting contact bar connected to said second diode terminal of said freewheeling diode, to one of said first switch terminals and to one of said second switch terminals;

an electrically and thermally conducting connecting post mounting to said power transistor on said bearing plate;

wherein said power transistor is electrically connected to one of said second switch terminal by said switching contact in the closed position thereof; and further wherein said bearing plate is connected to one of said first switch terminals.

2. The switch as defined in claim 1, further comprising an electrically conducting cooling lug maintaining an electric connection between said power transistor and said connecting post; and a heat sink mounted exteriorly on said switch housing; said power transistor being affixed to said heat sink.

3. The switch as defined in claim 1, further comprising an additional movable switching contact for short-circuit said control electronics; said additional movable switching contact being jointed to said base plate.

4. The switch as defined in claim 1, wherein said trigger includes a push rod integral therewith; further comprising a contact bridge mounted on said push rod to be movable therewith as a unit; said base plate including a contact arm being integral therewith and extending to said push rod; and a return spring supported in said switch housing and being in engagement with said push rod for urging said trigger into an initial position; in said initial position said contact bridge maintaining an electric connection between said contact arm and said contact bar.

5. The switch as defined in claim 2, wherein sad contact bar is received in said switch housing and carrying a connecting terminal coupling said freewheeling diode to said contact bar; said contact bar further having an electric contact point for contacting said contact bridge in said initial position of said trigger.

6. The switch as defined in claim 3, wherein said switch housing has an opening; said power transistor being positioned in said opening; said cooling lug being connected to said heat sink.

7. The switch as defined in claim 6, wherein said switch housing has a wall surface portion surrounding said opening; said heat sink sealingly engages said wall surface portion in a dust tight manner.

8. The switch as defined in claim 1, further comprising a right/left changeover switch interposed between one of said first switch terminals and said bearing plate and between another of said first switch terminals and said contact bar.

* * * * *